United States Patent [19]

Descoteaux et al.

[11] E Patent Number: Re. 31,991

[45] Reissued Date of Patent: Sep. 24, 1985

[54] SINGLE GUIDE ROD ACTUATING UNIT

[76] Inventors: Claude Descoteaux, Roseville; Chester Wenzel, Royal Oak, both of Mich.

[21] Appl. No.: 469,068

[22] Filed: Feb. 23, 1983

Related U.S. Patent Documents

Reissue of:

[64] Patent No.: 4,252,361
Issued: Feb. 24, 1981
Appl. No.: 39,854
Filed: May 17, 1979

[51] Int. Cl.[4] ..... B25J 15/04; B66C 1/42

[52] U.S. Cl. ..... 294/88; 269/34; 269/233; 294/116; 414/753

[58] Field of Search ..... 294/88, 95, 106, 115, 294/116; 81/349, 383.5, 57.18; 269/32, 34, 93, 196, 198, 199, 218, 233, 239; 414/226, 732, 739, 740, 753

[56] References Cited

U.S. PATENT DOCUMENTS

| | | | |
|---|---|---|---|
| 3,013,835 | 12/1961 | Blatt | 294/88 |
| 3,207,155 | 3/1962 | Patterson . | |
| 3,240,360 | 3/1966 | Richards | 294/116 X |
| 3,371,923 | 3/1968 | Blatt . | |
| 3,381,954 | 5/1968 | Blatt . | |
| 3,482,830 | 12/1968 | Sendoykas . | |
| 3,565,415 | 2/1971 | Blatt . | |
| 3,583,752 | 6/1971 | Panissidi | 294/88 |
| 3,618,931 | 11/1971 | Blatt . | |
| 3,635,514 | 1/1972 | Blatt | 294/106 |
| 3,714,870 | 2/1973 | Blatt | 294/88 X |
| 3,734,556 | 5/1973 | Misawa | 294/88 |
| 3,764,023 | 10/1973 | Jatcko | 414/739 |
| 3,815,894 | 6/1974 | Olson . | |
| 3,817,510 | 6/1974 | Jatcko | 269/34 |
| 3,819,171 | 6/1974 | Senodykas et al. . | |
| 4,021,027 | | Blatt . | |

FOREIGN PATENT DOCUMENTS

| | | | |
|---|---|---|---|
| 1456703 | 11/1976 | United Kingdom | 294/88 |

*Primary Examiner*—Johnny D. Cherry
*Attorney, Agent, or Firm*—Krass and Young

[57] ABSTRACT

The actuating unit mounts a workpiece gripping and transporting jaw assembly and has an elongated hanger rod supporting a first mount boss. A pneumatic cylinder is arranged below the rod and secured to the boss and has a conventional piston and piston rod projecting from the cylinder. The improvement which comprises an elongated guide rod between the cylinder and hanger rod slidably positioned through the mount boss projecting forwardly thereof and at one end supporting a jaw mount assembly having a longitudinal bore. A stroke adjuster collar is secured upon the other end of the guide rod and adapted to limit forward movement of the jaw mount assembly. A rod adapter is movably positioned through the bore of the jaw mount assembly which includes a first mount flange on the forward end thereof. A jaw assembly includes a body having an annular mounting flange at one end mounted upon the first mount flange and adjustably secured thereto. A pair of opposed workpiece gripping jaws are pivotally mounted within and project forwardly of the body. A reciprocal plunger is nested within the body axial to and operatively connected to the piston rod and rod adapter. A control mechanism is mounted upon the plunger and operatively engages the jaws for successively closing and opening the jaws corresponding to reciprocal movements of the plunger.

18 Claims, 5 Drawing Figures

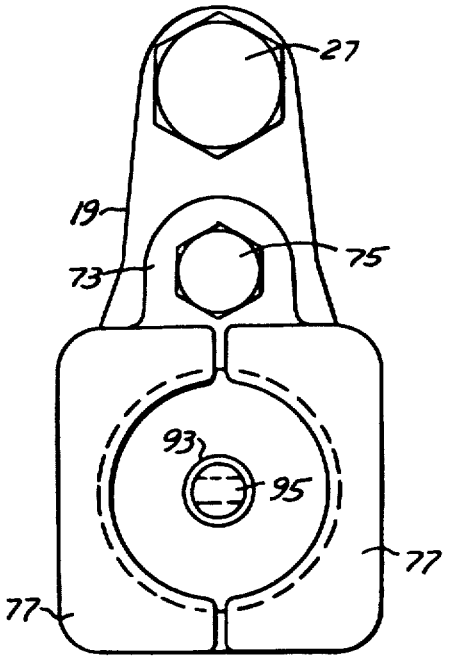
FIG. 3
FIG. 4
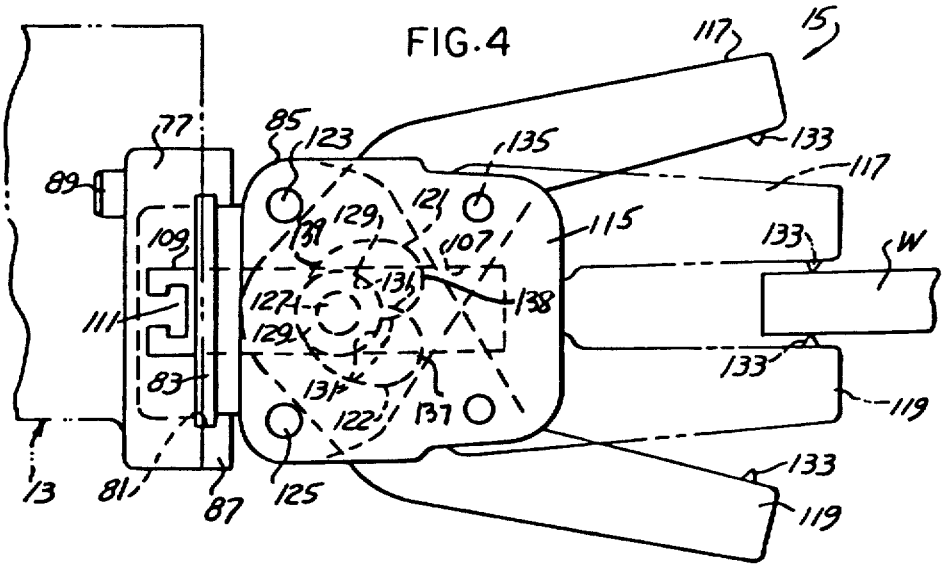

SINGLE GUIDE ROD ACTUATING UNIT

Matter enclosed in heavy brackets [ ] appears in the original patent but forms no part of this reissue specification; matter printed in italics indicates the additions made by reissue.

BACKGROUND OF THE INVENTION

Actuating units for a workpiece gripping and transporting jaw assembly are known having a hanger rod providing a mount boss depending therefrom and supporting a pneumatic cylinder below and parallel to said rod having a piston and a piston rod projecting from the cylinder. Heretofore jaw mount assemblies have been mounted upon the piston rod for feed movements therewith. Jaw assemblies have been mounted upon such jaw mount assemblies carrying a pair of opposed pivotal jaws adapted for gripping and transporting a workpiece in accordance with reciprocal movements of the piston rod relative to its supporting cylinder, as in U.S. Pat. Nos. 3,013,835 and 3,127,026.

SUMMARY OF THE INVENTION

The present invention is directed to improvements in such actuating unit, improvements in the construction of the jaw mount assembly and connections thereof as well as improvements in the jaw assembly and the manner of securing the same to the jaw mount assembly.

The invention provides for an improved elongated guide rod which is spaced between the cylinder and the hanger rod and slidably positioned through a mount boss suspended from the hanger rod. A guide rod at one end has secured thereto a jaw mount assembly adapted for reciprocal longitudinal movements coincident with movements of the piston rod. The other end of the guide rod carries an adjustable resilient stop engageable with the boss on said hanger rod adapted to limit forward movement of the jaw mount assembly for a predetermined feed distance and a cushioned stopping thereof.

The present invention also includes within the jaw actuating unit an improved rod adapter which is aligned with and connected with the piston rod for movement therewith and with one end of the rod adapter adapted for operative connection with the control plunger within the jaw assembly supported upon the jaw mount assembly.

There is provided an improved jaw mount assembly adapted for supporting a jaw assembly at one end, and mounting resilient means normally restraining the rod adapter against longitudinal movement relative to the jaw actuating assembly whereby initial longitudinal movement of the piston rod effects a longitudinal translation in one direction of the jaw mount assembly and wherein after a predetermined feed movement thereof the piston rod is effective for advancing the rod adapter relative to the jaw mount assembly in such fashion as to axially activate and effect control movements of the plunger within the jaw assembly for controlling movements of the jaws with respect to a workpiece.

The present improvement also includes an improved jaw assembly which is constructed for so mounting upon the jaw mount assembly as to be capable of rotation upon a longitudinal axis throughout 360° without disconnecting the plunger from the rod adapter and thereby position the jaws in the plane correct for the inclination of a particular workpiece to be grasped thereby.

The present improvement also includes an improved and simplified jaw assembly wherein a pair of jaw arms are pivotally mounted within a jaw body and project forwardly therefrom and include angular cam slots therein in conjunction with rollers mounted upon the reciprocal plunger with the rollers nested respectively within the angular slots of the jaws so that movement of the plunger in one direction closes the jaws and movement of the plunger in the opposite direction opens the jaws.

These and other objects and improvements will be seen for the following Specification and Claims in conjunction with the appended Drawings.

THE DRAWINGS

FIG. 3, is an end view thereof taken in the direction of arrows 3—3 of FIG. 1.

FIG. 4, is a side elevational view of the jaw assembly fragmentarily shown in FIG. 1 with a portion of the jaw mount assembly fragmentarily shown.

It will be understood that the above drawings illustrate merely a preferred embodiment of the invention, and that other embodiments are contemplated within the scope of the Claims hereafter set forth.

DETAILED DESCRIPTION OF THE INVENTION

Figure 1:
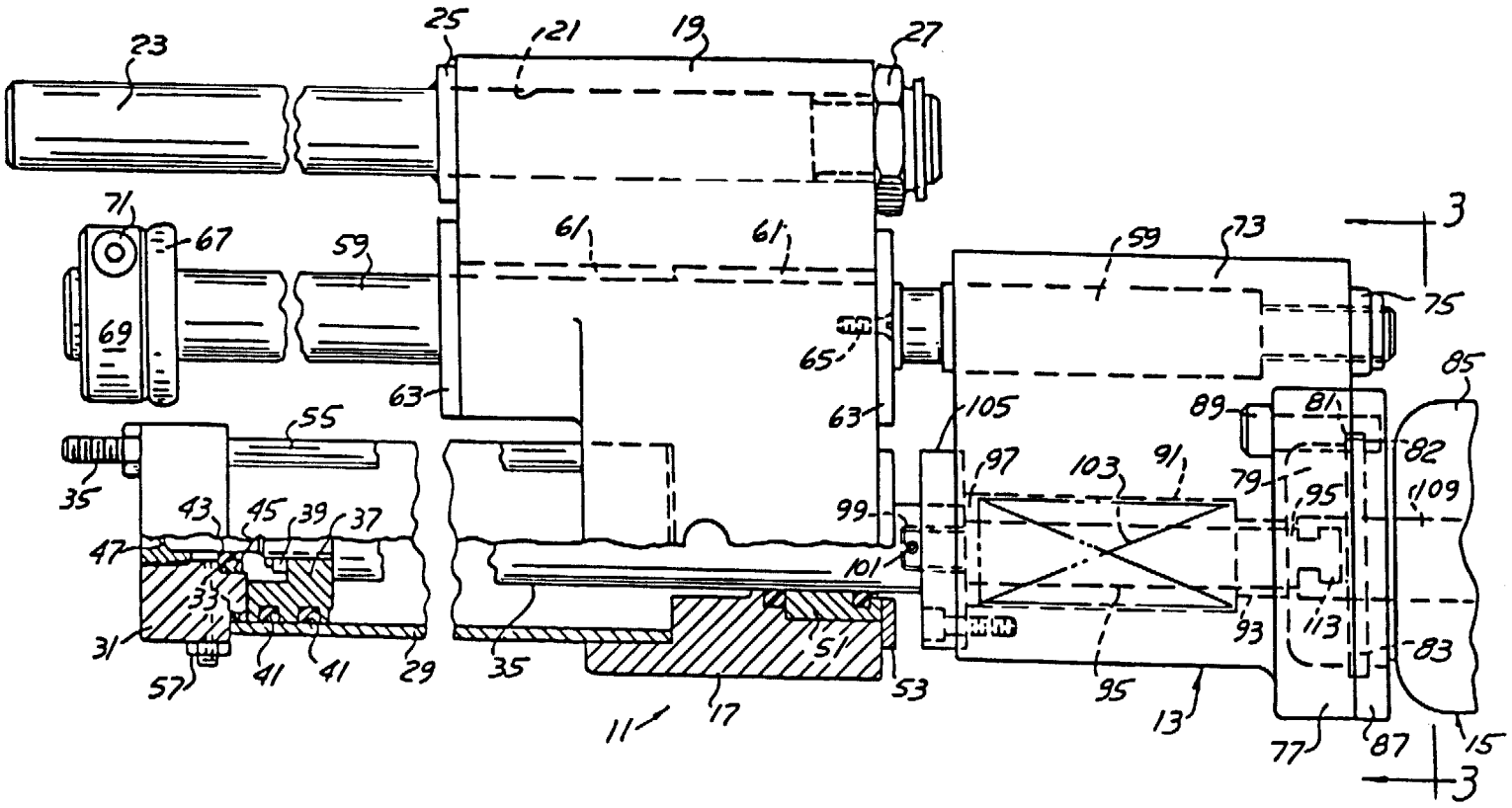
FIG. 1, is a side elevational view, partly sectioned illustrating the present single guide rod actuating unit, the jaw mount assembly connected thereto with portions of the jaw assembly fragmentarily shown.
Figure 2:
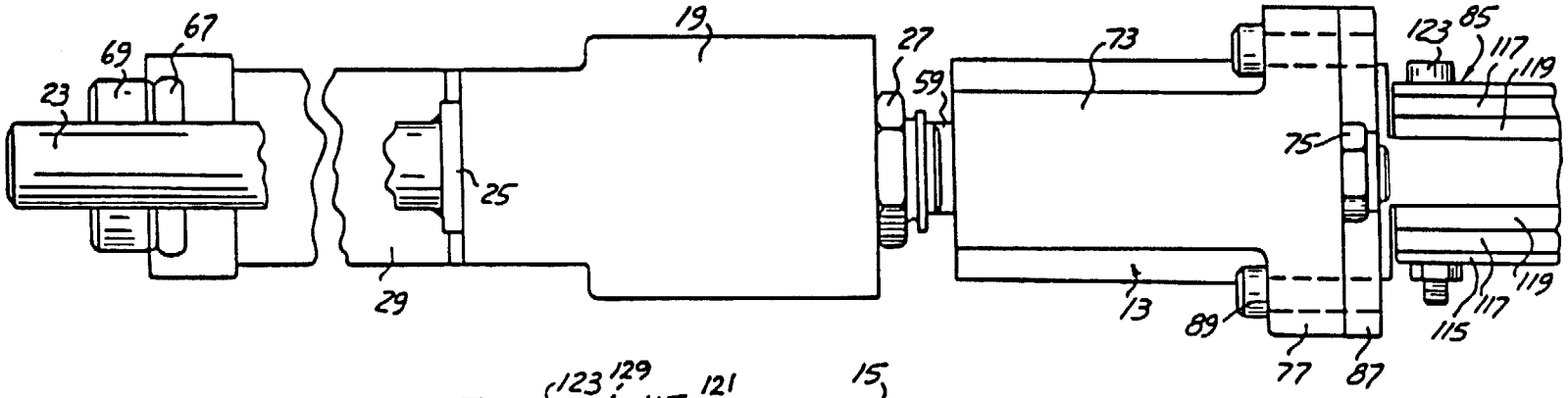
FIG. 2, is a plan view thereof partly broken away and sectioned.
Figure 5:
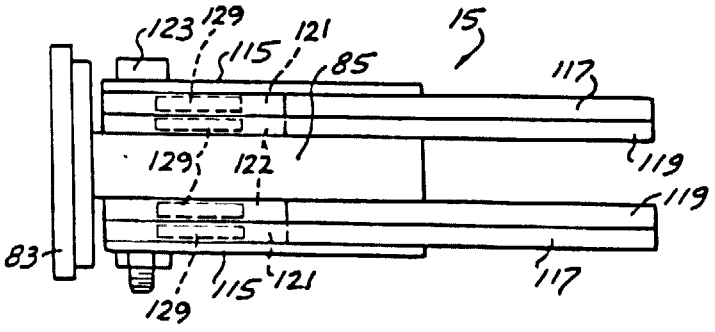
FIG. 5, is a plan view of the jaw assembly shown in FIG. 4.

Referring to the drawings a single guide rod actuating unit is designated at 11 in FIGS. 1 and 2 including jaw mount assembly 13 and carried thereby. A cam lock jaw assembly 15 including jaws adapted for operative engagement with workpiece W is shown in FIGS. 4 and 5.

The present actuating unit includes a body 17 having an overlying first mount boss 19, FIGS. 1 and 2, having a longitudinal bore 21 receiving one end of the elongated hanger rod 23.

The horizontally disposed hanger rod has a collar 25 thereon engaging one side of said mount boss. A lock nut 27 is threaded over the projecting end of rod 23 and operatively bears against the opposite side of said mount boss.

The cylinder 29 at one end projects into body 17 which serves as a cylinder head. End cap 31 is sealed and connected to the outer end of said cylinder functioning as the second cylinder head, and is sealed thereon at 33.

The cylinder which in the preferred embodiment is a pneumatic cylinder, but other equivalent cylinders are contemplated, includes piston rod 35 which at one end projects through the piston 37 and is secured thereto by fastener 39. Conventional seals 41 are mounted upon said piston in registry with the cylinder wall.

Cushion seal 43 upon the interior of end cap 31 is retained in position by cushion ring 45. The cushion rod extension 47 upon said piston rod is adapted for cooperative sealing engagement with respect to cushion seal 43. The entrapped air within the cylinder head 31 compresses to a certain extent and is adapted to cushion the return movement of the piston rod extension 47 as it moves to the retracted position shown in FIG. 1. This is a conventional construction.

Within the body 17 at one end thereof there is nested bushing 51 held in place by retainer 53 secured to said body. A plurality of tie rods 55 extend through end cap cylinder head 31 and are suitably secured thereto by fasteners, with the other ends extending to and secured to body 17 which also functions as a cylinder head.

A cushion bleed assembly is designated at 57 projecting into the end cap 31 and in communication with the chamber therein controlling the bleeding of compression air therefrom when the piston has returned to the retracted cushioned position shown in FIG. 1.

An elongated guide rod 59 is arranged between and parallel to hanger rod 23 and said cylinder, slidably extends through a pair of aligned bushings 61 within a corresponding bore in the boss 19. These are retained therein by retainer plates 63 secured upon opposite end portions of said boss as by fasteners 65.

A stroke adjuster collar 69 is adjustably mounted adjacent one end of guide rod 59 and secured thereto as by fastener 71. A urethane or other resilient stop 67 is mounted upon said guide rod and normally bears against stroke adjuster collar 69.

Guide rod 59 projects through and forwardly of first mount boss 19 in advance of cylinder 29, projects into and through the second mount boss 73 on jaw mount assembly 13, FIGS. 1 and 2, and is secured thereto by fastener 75.

A pair of opposed first mount flanges 77 form a part of the jaw mount assembly 13 depending from the second boss 73 defining the bore 79 and outwardly thereof counter bore 81 defining a stop shoulder 82.

The actuating unit 13 and its mount boss 73 includes therein the longitudinal bore 91 which terminates in counter bore 93 of reduced diameter which in turn communicates with bore 79 within the first mount flanges 77.

Cam lock jaw assembly 15, fragmentarily shown in FIGS. 1 and 2 and in more detail in FIGS. 4 and 5 has a body 85 and at one end thereof a rearwardly extending annular flange 83 which is adapted to nest within counter bore 81 and bear against the shoulder 82 formed with respect to the first mount flanges 77.

Annular collar 87 is apertured to received second mount flange 83 on said body, bears against first mount flanges 77 and is secured thereto by a series of fasteners 89, FIGS. 1 and 2.

Annular mounting flange 83 is so arranged with respect to counter bore 81 and stop shoulder 82 within first mount flanges 77 that upon mere loosening of the fasteners 89 the jaw body 85 may be rotated to any desired angular position throughout 360° in order for the jaws to be in the correct plane for gripping the workpiece W fragmentarily shown in FIG. 4. This depends upon the preselected plane of said workpiece such as the angle at which it is supported within a press or die or other machine tool for a forming or other operation.

Once the jaw body 85 has been rotated with respect to the jaw mount assembly 13 to the correct angular position it is secured in such position merely by tightening the fasteners 89.

The jaw mount assembly includes elongated rod adapter 95 which extends through bore 91 and counter bore 93 through washer 97 within said longitudinal bore and includes a rod end 99 whih is threaded into piston rod 35, axially thereof and is secured thereto by the pin 101.

The other end of the rod adapter extends through counter bore 93 and into bore 79 and terminates in an undercut flange 113, of T-shape in cross section.

Elongated compression spring 103 is nested within longitudinal bore 91, at one end bears against a portion of the boss 73 and at its opposite end bears against washer 97. Said washer is retained within an end portion of bore 91 by spring retainer bushing 105 suitably secured to one end of said boss, FIG. 1.

CAM LOCK JAW ASSEMBLY

Jaw assembly 15 shown adjustably mounted upon the forward end of jaw mount assembly 13 is shown in detail in FIGS. 4 and 5 and includes the body 85 having a longitudinal bore 107 within which is movably nested the elongated plunger 109.

Said plunger is coaxial to rod adapter 95 and at one end has an undercut T-shaped annular slot 111 adapted for interlocking assembly and registry with the corresponding T-shaped annular flange 113. The connection between the plunger and the adapter is such that the jaw assembly body 85 is free to rotate throughout 360° without disconnecting the plunger from adapter rod 95.

The jaw body includes upon its opposite sides the substantially upright coverplates 115, FIG. 5. Outside jaw assembly 117 includes a pair of parallel spaced jaw arms which extend into the jaw body, bear against the interior of the covers 115 and are pivotally mounted upon said body by the lower transverse pivot bolt 125 suitably secured to said body as shown in FIGS. 4 and 5. Accordingly, the outside jaw assembly 117 is pivotally mounted within body 85 and projects angularly forward thereof, FIG. 4, and includes upon their inner surfaces conventional workpiece grippers 133.

The inside jaw assembly 119 similarly includes a pair of spaced jaw arms arranged adjacent to and inwardly of the jaw arms of the outside jaw assembly, extends into the body and is pivotally connected thereto by the transverse pivot bolt 123, FIG. 4. The forward ends of the arms of the inside jaw assembly project forwardly of said body and upon their interior surfaces have the conventional workpiece grippers 133.

Each of the arms of the outside jaw assembly have formed therein first acute angular control slots 121. The arms corresponding to the inside jaw assembly 119 have formed therein corresponding acute angular control slots 122.

The said slots are diverging respectively and extent at an acute angle with respect to the longitudinal axis shown in FIG. 4.

Roller shaft 127 extends through plunger 109 and through the respective first and second slots 121 and 122 formed within the respective arms of the outside jaw assembly and inside jaw assembly. A pair of control rollers 129 are mounted upon roller shaft 127 upon opposite sides of plunger 109 and respectively nest within the corresponding first and second angular control slots 121 and 122 as shown in FIG. 4.

Each of the control slots 121 and 122 has arcuate portions *137,138* at their opposite ends and upon one side of each slot inwardly extending stop shoulder 131 *between arcuate portions 137,138. This shoulder is in operative engagement with each of the rollers 129 when plunger 109 is in the retracted position shown locking the inside and outside jaw assemblies in the open position shown. Also in*

*the advanced position of plunger 109, the* [washers] *rollers 129* engage stop shoulders 131 for securing the jaws in closed position. *The other side of each of the slots 121,122 includes a substantially continuous arcuate section 139 which opposes stop shoulder 131 and connects arcuate portions 137,138.*

In operation forward longitudinal movement of the plunger 109 within the bore 107 of the jaw body 105 will cause a simultaneous forward movement of the respective rollers 129 within the respective acute angularly related angular control slots 121 and 122 in the respective jaw assemblies 117 and 119 camming the jaws to the workpiece gripping dash line position shown in FIG. 4.

The rollers 129 in such forward position with respect to the slots 121 and 122 are again in operative engagement with the slot stop shoulders 131 in effect locking the jaw assemblies in the workpiece gripping position.

When the plunger 109 is retracted to the initial position shown in FIG. 4, the rollers acting upon the angular slots 121,122 will open the jaw assemblies to the solid line position shown. In such operation of the jaw assembly 15 wherein only one pair of jaws are adapted to move inwardly and outwardly with respect to the other pair of jaws, means are provided for anchoring the outside jaw assembly 117 in the dash line closed workpiece engaging position shown in FIG. 4. For this purpose opposed aligned pins 135 extend through portions of the jaw body side plates 115 and into it corresponding portions of the arms of the outside jaw assembly 117. In this situation however one pair of rollers which would normally be nested within the control slots 121 corresponding to the outside jaw assembly will be eliminated.

Accordingly reciprocal movements of the plunger 109 will affect only the rollers 129 which correspond to the inside jaw assembly 119 controlling movements of the inside jaw assembly from the solid line position to the dash line workpiece engaging position shown in FIG. 4.

OPERATION

In the position of the parts shown in FIGS. 1, 2 and 4, piston 37 and piston rod 35 are in a retracted position due to suitable pressurization of the cylinder 29 and its respective heads 17 and 31 by conventional ports therein by which compressed air, for illustration, is applied to one end of the piston or the other such as for retracting the piston to the position shown. The piston rod is retracted and the jaws are open as in FIG. 4.

Under the control of a suitable four-way valve, not shown, and with pressurization of the other port within the cylinder head 31 the piston and piston rod 35 will advance forwardly causing a simultaneous forward movement of the jaw mount assembly 13 which is engaged by the outer end of the piston rod with movement continuing until the resilient stop 67 engages first mount boss 19. In effect the outer end of the piston rod extends through spring retainer bushing 105 and is in engagement with the washer 97 which is normally held in the retracted position shown by the expanded coil spring 103 within the jaw mount assembly.

With the stop 67 in engagement with mount boss 19 this will stop further forward movement of the jaw mount assembly 13 and the associated second boss 73, FIGS. 1 and 2 at such preselected position that the respective jaws 117 and 119 will be in registry with an edge portion of the workpiece W, FIG. 4.

Continuing to energize the piston 37 the piston rod will continue forward movement against the washer 97 and into the bore 91 compressing the spring 103 and causing a corresponding longitudinal movement of the adapter rod 95, relative to boss 73.

The adapter rod at its other end is connected to the plunger 109, FIG. 4 and causes a simultaneous further forward axial projection of said plunger which through the rollers 129 cam the jaws to the workpiece gripping position shown in dash lines.

When the cylinder 29 is now activated from its opposite end to cause a retraction of its piston 37 such initial retracting movement of the piston and piston rod will cause a corresponding retraction of the jaw mount assembly 13 and the supported jaw assembly 15 a predetermined distance for withdrawing the workpiece to a point where it is to be unloaded. Such retraction may be limited by some portion of the jaw mount assembly 13 engaging a stop. Since the spring 103 is under compression it has sufficient strength as to expand returning the washer 97 to the position shown in FIG. 1 and simultaneously further retracting the piston rod to the position shown and at the same time effecting corresponding retraction of the adapter rod 95 and the connected plunger. Such retracting movement of the plunger 109 as in FIG. 4 will cause the jaws to open to the solid line position shown releasing the workpiece W at such predetermined location and completing the cycle.

Having described our invention reference should now be had to the following claims.

We claim:

1. In an actuating unit for a workpiece gripping and transporting jaw assembly having an elongated hanger rod, a first mount boss depending from said rod, a pneumatic cylinder below and parallel to said rod and secured to said boss having a piston and a piston rod projecting from said cylinder;

the improvement comprising an elongated guide rod spaced between and parallel to said cylinder and hanger rod and slidably positioned through said mount boss and projecting forwardly thereof;

a jaw mount assembly including a second mount boss positioned forwardly of said cylinder and having a longitudinal bore;

one end of said guide rod extending through said second mount boss and secured thereto;

a stroke adjuster collar adjustably secured upon the other end of said guide rod adapted on a predetermined forward movement of said jaw mount assembly to operably engage said first mount boss;

a rod adapter movably positioned through said bore axially of and at one end secured to said piston rod;

a first mount flange upon the forward end of said second boss having a bore communicating with said longitudinal bore and a counter bore defining an annular stop shoulder;

a jaw assembly including a body having a longitudinal bore and an annular mounting flange at one end;

said mounting flange being nested within said counter bore of said jaw mount assembly first mount flange and bearing against said shoulder and adjustably secured thereto;

a pair of opposed workpiece gripping jaws pivotally mounted within and projecting forwardly of said body;

a reciprocal plunger nested within the bore of said body axial to and at one end operably connected to the other end of said rod adapter;

and a control means on said plunger operably engaging said jaws for successively closing and opening said jaws upon corresponding reciprocal movements of said plunger;

the securing of said mounting flange including a collar receiving and retainingly engaging said mounting flange and secured to said first mount flange;

the securing of said mounting flange retaining collar including a plurality of fasteners interconnecting said first mount flange and collar, said mounting flange being rotatably adjustable throughout 360° relative to said mount flange on loosening of said fasteners.

2. In an actuating unit for a workpiece gripping and transporting jaw assembly having an elongated hanger rod, a first mount boss depending from said rod, a pneumatic cylinder below and parallel to said rod and secured to said boss having a piston and a piston rod projecting from said cylinder;

the improvement comprising an elongated guide rod spaced between and parallel to said cylinder and hanger rod and slidably positioned through said mount boss and projecting forwardly thereof;

a jaw mount assembly including a second mount boss positioned forwardly of said cylinder and having a longitudinal bore;

one end of said guide rod extending through said second mount boss and secured thereto;

a stroke adjuster collar adjustably secured upon the other end of said guide rod adapted on a predetermined forward movement of said jaw mount assembly to operably engage said first mount boss;

a rod adapter movably positioned through said bore axially of and at one end secured to said piston rod;

a first mount flange upon the forward end of said second boss having a bore communicating with said longitudinal bore defining an annular stop shoulder;

and a jaw assembly including a body having a longitudinal bore and an annular mounting flange at one end;

said mounting flange being nested within said counter bore of said jaw mount assembly first mount flange and bearing against said shoulder and adjustably secured thereto;

a pair of opposed workpiece gripping jaws pivotally mounted within and projecting forwardly of said body;

a reciprocal plunger nested within the bore of said body axial to and at one end operably connected to the other end of said rod adapter;

and a control means on said plunger operably engaging said jaws for successively closing and opening said jaws upon corresponding reciprocal movement of said plunger;

said control means on said plunger including a roller shaft extending through said plunger;

a first roller and a second roller mounted on said roller shaft;

there being first and second acute angular slots formed through said jaws respectively, within said body;

said first roller movably nested within said first angular slot and said second roller movably nested within said second angular slot, whereby forward movement of said plunger cams said jaws to a closed position and retraction of said plunger cams said jaws to an open position;

one jaw including a pair of parallel outside jaw arms, with said first angular slots therein;

the other jaw including a pair of parallel inner jaw arms with said second angular slots therein;

there being additional rollers upon said roller shaft, with one roller in each of said angular slots;

each angular slot having a first arcuate portion at one end and a second arcuate portion at its other end, said arcuate portions on one side of each slot having an interconnecting stop shoulder retainingly engaging said rollers respectively.

3. In the actuating unit of claim 2, opposed lock pins on said jaw body extending into said outer jaw arms holding them in a closed stationary position;

the corresponding rollers for said outer jaw arms being removable.

*4. Apparatus for gripping a workpiece, comprising:*

*a body;*

*a plunger reciprocably mounted on said body and adapted to be coupled with a source of power for reciprocating said plunger;*

*at least one workpiece gripping member pivotally mounted on said body for movement between an open position and a closed position; and*

*a cam arrangement for controlling the movement of said gripping member, said cam arrangement including*

*(1) a slot defined in said one gripping member, said slot including adjacent arcuate portions defining a cam track,*

*(2) a shoulder between said arcuate portions and extending into said slot, and*

*(3) a cam member connected with said plunger for reciprocation therewith, said cam member extending into said slot and being engagable with said shoulder to lock said gripping member in said closed position thereof upon loss power from said power source.*

*5. The apparatus of claim 4, wherein said slot extends at an acute angle to the longitudinal axis of said plunger.*

*6. The apparatus of claim 4, wherein said cam member includes a roller captured within said slot and engaging said cam track.*

*7. The apparatus of claim 4, including another workpiece gripping member mounted on said body and cooperating with said one workpiece gripping member to grip said workpiece.*

*8. The apparatus of claim 7, wherein said another workpiece gripping member is stationarily mounted on said body relative to said one workpiece gripping member.*

*9. The apparatus of claim 7, wherein:*

*said another workpiece gripping member is pivotally mounted on said body for movement between an open position and a closed position,*

*said cam arrangement being operative to control the movement of said another workpiece gripping member and further including*

*(1) a slot defined in said another workpiece gripping member, said slot including adjacent arcuate portions defining a cam track,*

*(2) a shoulder between said arcuate portions and extending into said slot, and*

*(3) a cam member connected with said plunger for reciprocation therewith, said cam member extending into said slot in said another gripping member and being engagable with said shoulder to lock said*

*another workpiece gripping member in said closed position thereof upon loss of power from said power source.*

*10. The apparatus of claim 9, wherein said slot in said another gripping member extends at an acute angle to the longitudinal axis of said plunger and diverges away from said slot in said one gripping member.*

*11. In a unit for gripping and transporting a workpiece and of the type including the combination of an actuating unit and a jaw assembly controlled by said actuating unit, said actuating unit including a fluid operated piston and cylinder assembly having a piston rod coupled with said jaw assembly, said jaw assembly and reciprocable between a first position in which said jaw assembly is open and a second position in which said jaw assembly is closed including a pair of jaws for gripping said workpiece therebetween, the improvement comprising:*

*a cam mechanism drivingly connected with said piston rod for controlling the operation of said jaws, said cam mechanism including*

*(1) first and second cam slots respectively associated with said jaws, each of said slots including first and second adjacent portions,*

*(2) a pair of shoulders respectively associated with said first and second cam slots and between said adjacent portions, said shoulders extending into the corresponding slots, and*

*(3) a pair of cam members respectively associated with said slots and extending into said slots, said cam members being connected to and driven by said piston rod, said cam members being engagable with the corresponding shoulders to lock said jaws in a closed gripping position when said rod is in said second position thereof and fluid pressure is lost in cylinder, said shoulders being shiftable away from said cam members when said rod is reciprocated from said second position to said first position.*

*12. The improved unit of claim 11, wherein said slots diverge away from each other and extend at an acute angle relative to the longitudinal axis of said piston rod.*

*13. The improved unit of claim 11, wherein said pair of slots are disposed in side-by-side registration with each other.*

*14. The improved unit of claim 11, wherein said pair of slots are respectively defined in said jaws and said first and second portions are each arcuate in shape.*

*15. In a device for gripping or clamping a workpiece, said device including the combination of a body, at least one gripping member pivotally mounted on said body for pivotal movement between an open, released position and a closed-gripping position, a plunger reciprocably mounted on said body and means for drivingly connecting said gripping member with said plunger, the improvement in said connecting means comprising:*

*a cam mechanism including*

*(1) a cam slot in said gripping member, said cam slot including first and second arcuate portions,*

*(2) a stop shoulder on one side of said cam slot and between arcuate portions, and*

*(3) a cam member connected with said plunger and disposed within said cam slot, said stop shoulder retainingly engaging said cam member to lock said gripping member in said closed gripping position thereof in response to force applied to said gripping member by said workpiece but allowing passage of said cam member to release said gripping member when force is applied to said gripping member by said plunger to pivot said gripping member to said open position.*

*16. The improvement of claim 15, wherein said slot includes a substantially continuous arcuate section on another side of said slot opposite said one side.*

*17. The improvement of claim 16, wherein said stop shoulder extends into said slot and toward said another side of said slot.*

*18. The improvement of claim 15, wherein said cam member includes a roller engaging the sides of said slot.*

* * * * *